(12) United States Patent
Kiwan et al.

(10) Patent No.: US 12,540,583 B1
(45) Date of Patent: Feb. 3, 2026

(54) METHODS AND SYSTEMS FOR V8 ENGINE FUEL CONTROL

(71) Applicant: Ford Global Technologies, LLC, Dearborn, MI (US)

(72) Inventors: Rani Kiwan, West Bloomfield, MI (US); Stephen W. Magner, Farmington Hills, MI (US); Michael Uhrich, Wixom, MI (US); Chris Paul Glugla, Macomb, MI (US); Michael Calvin McKinney, Trenton, MI (US); Stephen Lee Cooper, Hamtramck, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/793,530

(22) Filed: Aug. 2, 2024

(51) Int. Cl.
*F02D 35/00* (2006.01)
*F02D 41/30* (2006.01)

(52) U.S. Cl.
CPC ......... *F02D 35/0092* (2013.01); *F02D 41/30* (2013.01)

(58) Field of Classification Search
CPC ............................ F02D 35/0092; F02D 41/30
See application file for complete search history.

(56) References Cited

U.S. PATENT DOCUMENTS

| | | | | |
|---|---|---|---|---|
| 1,005,186 | A * | 10/1911 | Ford | F16H 3/663 475/277 |
| 9,657,674 | B2 | 5/2017 | Jammoussi et al. | |
| 10,215,115 | B1 | 2/2019 | Ranga et al. | |
| 2007/0125070 | A1* | 6/2007 | Storhok | F01N 3/0842 60/284 |
| 2011/0204668 | A1* | 8/2011 | Pauken | B60R 7/02 296/37.7 |
| 2012/0285142 | A1* | 11/2012 | Shibata | F02D 41/1454 60/276 |
| 2020/0291883 | A1 | 9/2020 | Magner et al. | |
| 2023/0134097 | A1* | 5/2023 | Vazirani | F02D 41/1475 60/286 |

FOREIGN PATENT DOCUMENTS

GB      2064171 A      6/1981

OTHER PUBLICATIONS

Kiwan, R. et al., "Methods and Systems for Verifying Oxygen Sensor Connections," U.S. Appl. No. 18/793,568, filed Aug. 2, 2024, 39 pages.

* cited by examiner

*Primary Examiner* — Carl C Staubach
(74) *Attorney, Agent, or Firm* — Vincent Mastrogiacomo; McCoy Russell LLP (57) ABSTRACT

Systems and methods for controlling fuel that is supplied to cylinders of an internal combustion engine are described. In one example, oxygen sensors are placed in an exhaust system of an engine such that each oxygen sensor may detect exhaust gas from a pair of engine cylinders. The oxygen sensors may then provide feedback to coupled and decoupled fuel controllers.

20 Claims, 5 Drawing Sheets

METHODS AND SYSTEMS FOR V8 ENGINE FUEL CONTROL

FIELD

The present description relates to a system and methods for controlling fuel supplied to cylinders of an internal combustion engine. The methods may be particularly useful for V8 engines configured with a cross-plane crankshaft.

BACKGROUND AND SUMMARY

An internal combustion engine may operate with a closed-loop fuel control system. The closed-loop fuel control system operates to drive a measured air-fuel ratio to a requested air-fuel ratio. The measured air-fuel ratio may be inferred via an oxygen sensor that senses exhaust gases. The closed-loop fuel control system may include a fuel injector that supplies fuel to a cylinder. As part of a comprehensive control system, the closed-loop fuel control system may include diagnostics to evaluate whether or not the fuel control system is operating as may be expected.

One diagnostic that the fuel system may include is an air-fuel ratio imbalance diagnostic. This diagnostic seeks to determine if an air-fuel ratio of one cylinder of a cylinder bank deviates from an air-fuel ratio of one or more other cylinders of the cylinder bank by more than a predetermined amount. This diagnostic helps to ensure that each cylinder of a bank of cylinders is operating as requested even though, on average, cylinders of the cylinder bank are operating at a requested air-fuel ratio. Thus, this diagnostic may make it possible for a properly operating cylinder to reduce going leaner or richer than may be desired to compensate for a cylinder having degraded air-fuel control while maintaining the average air-fuel ratio for the cylinder bank at a requested air-fuel ratio.

Cylinder firings for cross-plane crankshaft V8 engines may be unevenly spaced with 90°, 180°, 270°, 180° cylinder firing intervals. These uneven firing intervals may cause residency times of exhaust pulses at oxygen sensors to vary for cylinders of a same cylinder bank. Consequently, discrepancies may occur in an air-fuel ratio imbalance signal.

The inventors herein have recognized the above-mentioned disadvantages and have developed a fuel control system, comprising: a first cylinder bank coupled to an exhaust system that includes a first oxygen sensor upstream of a first catalyst and a second oxygen sensor upstream of the first catalyst; a second cylinder bank coupled to the exhaust system that includes a third oxygen sensor upstream of a second catalyst and a fourth oxygen sensor upstream of the second catalyst; and a controller including executable instructions stored in non-transitory memory for a first fuel controller, a second fuel controller, a third fuel controller, and a fourth fuel controller.

By applying an oxygen sensor for each cylinder pair, it may be possible to resolve the discrepancy in air-fuel ratio imbalance signals due to residency issues with exhaust pulses so that air-fuel imbalances may be detected with a higher degree of precision. Further, the additional oxygen sensors enable coupled controllers that may have capacity to reduce engine emissions via converging to a requested air-fuel ratio sooner. Further, the approach described herein allows a system to apply both coupled and uncoupled controllers so that features of both controllers may be leveraged to provide more responsive and precise air-fuel ratio control.

The present description may provide several advantages. In particular, the approach may lower engine emissions utilizing controllers that converge to their requested value sooner than other types of controllers. Additionally, the approach may provide more precise air-fuel ratio control while allowing air-fuel ratio imbalance to be detected. Further, the approach may be applied to both V8 and four cylinder engines.

The above advantages and other advantages, and features of the present description will be readily apparent from the following Detailed Description when taken alone or in connection with the accompanying drawings.

It may be understood that the summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
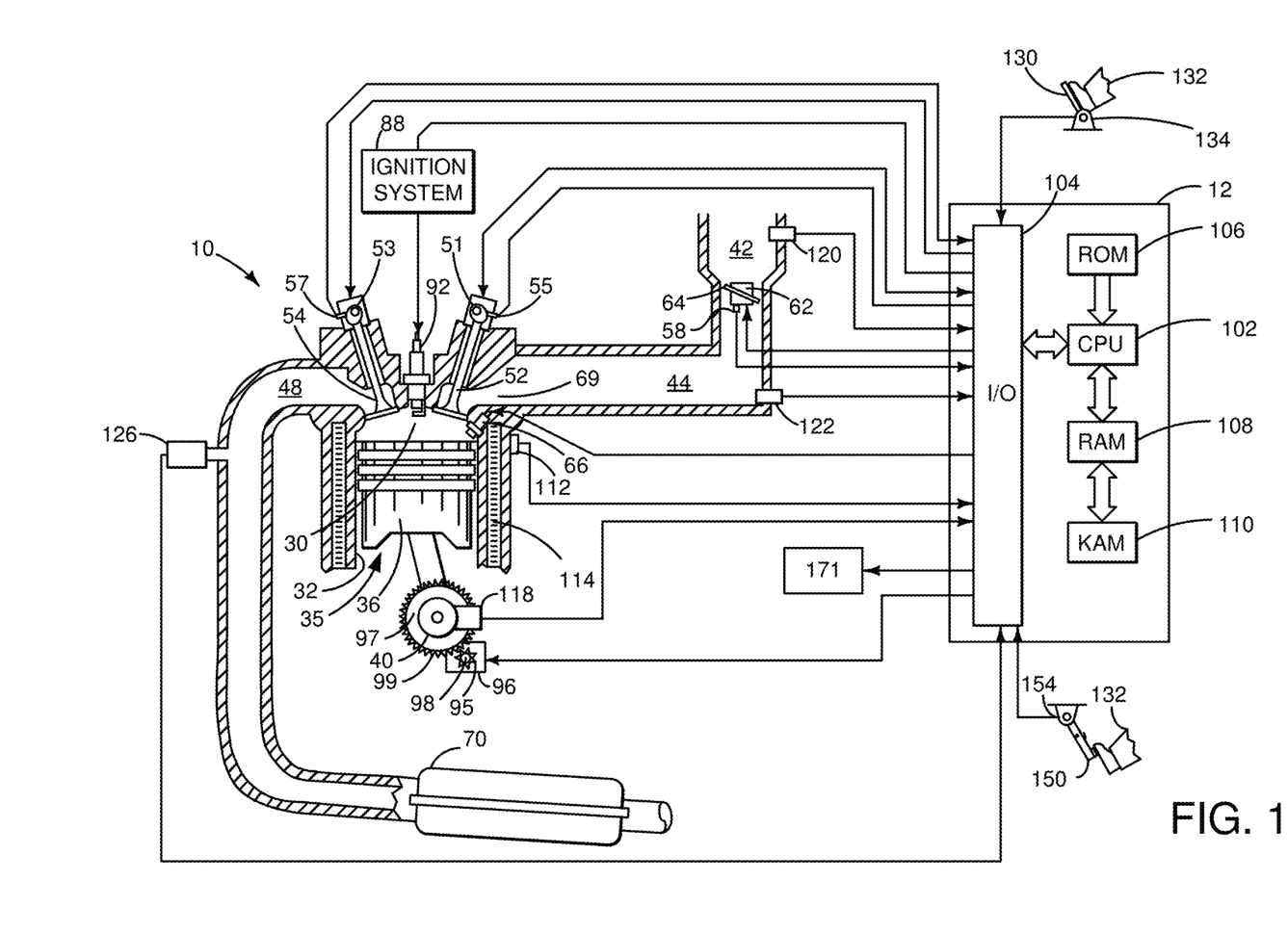
FIG. 1 is a schematic diagram of a single cylinder of an engine.
Figure 2:
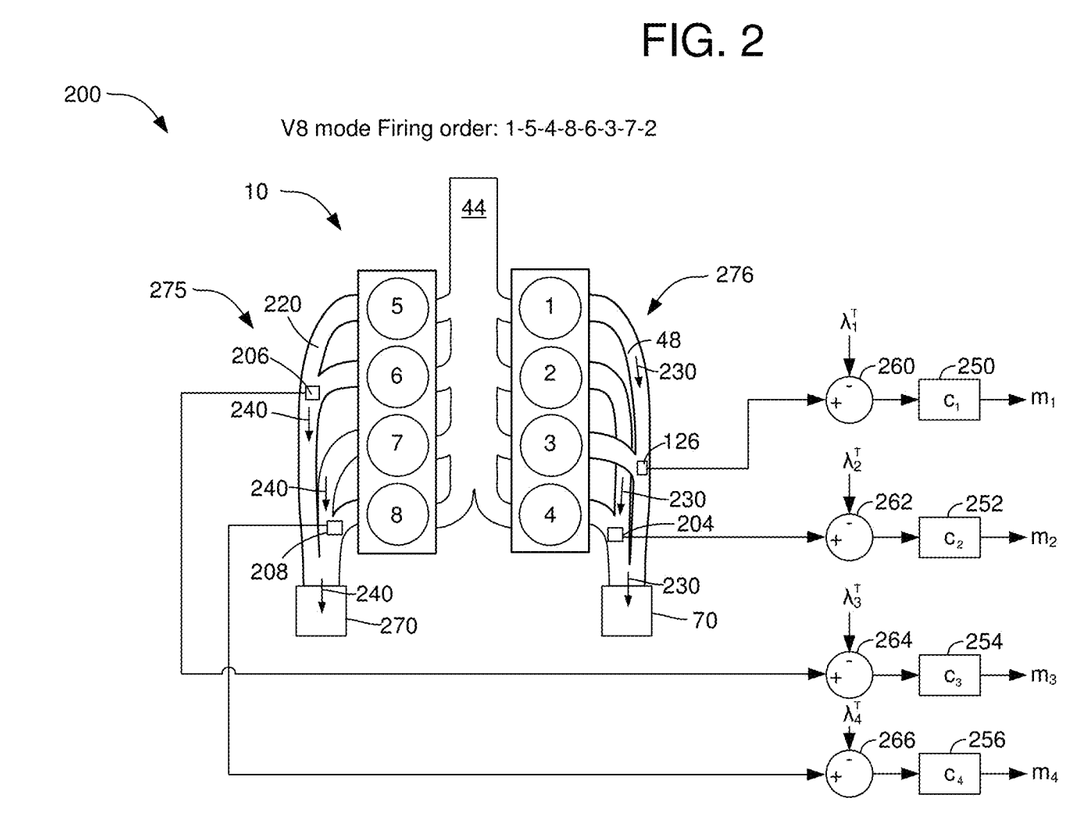
FIG. 2 is a schematic diagram of an eight-cylinder engine and a rendering of a first air-fuel ratio control system arrangement.
Figure 3:
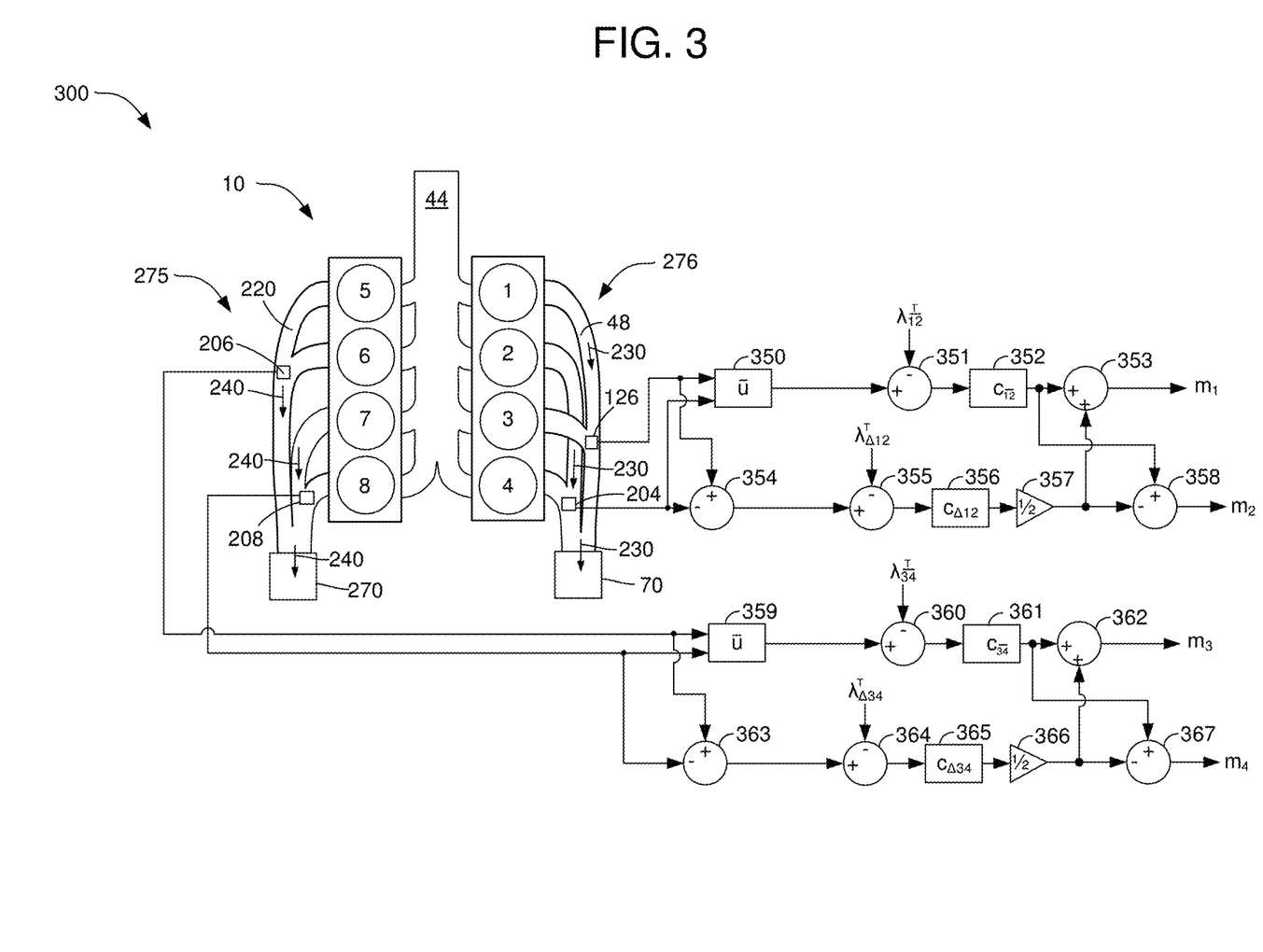
FIG. 3 is a schematic diagram of an eight-cylinder engine and a rendering of a second air-fuel ratio control system arrangement.
Figure 4:
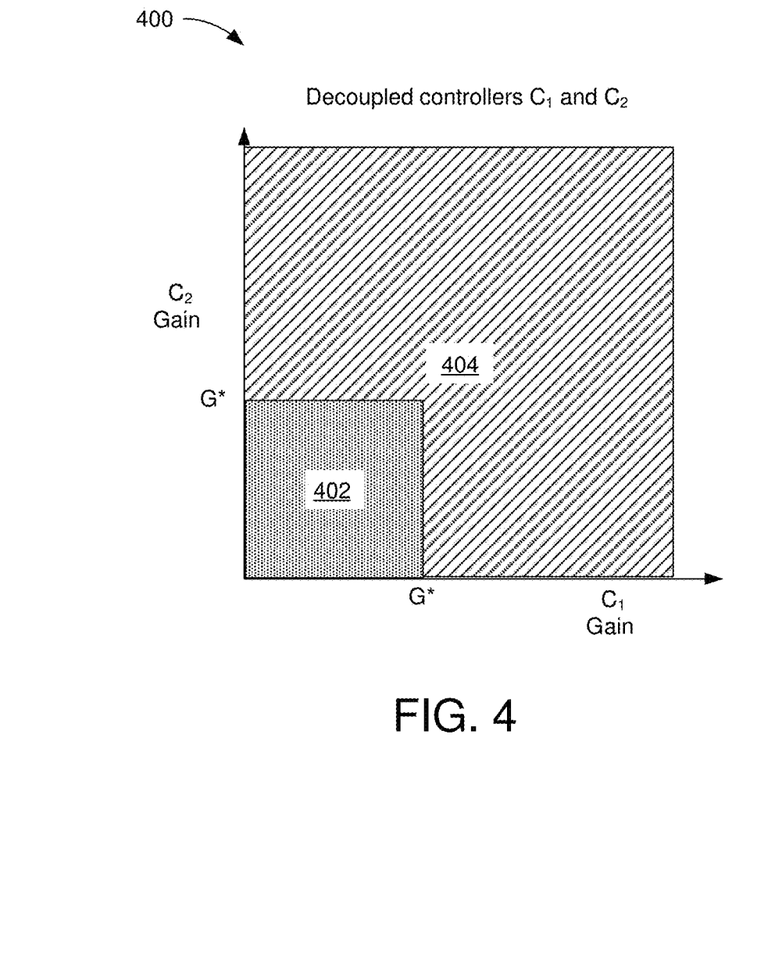
FIGS. 4 and 5 show stability regions for controller gains for two different air-fuel ratio control approaches.
Figure 5:
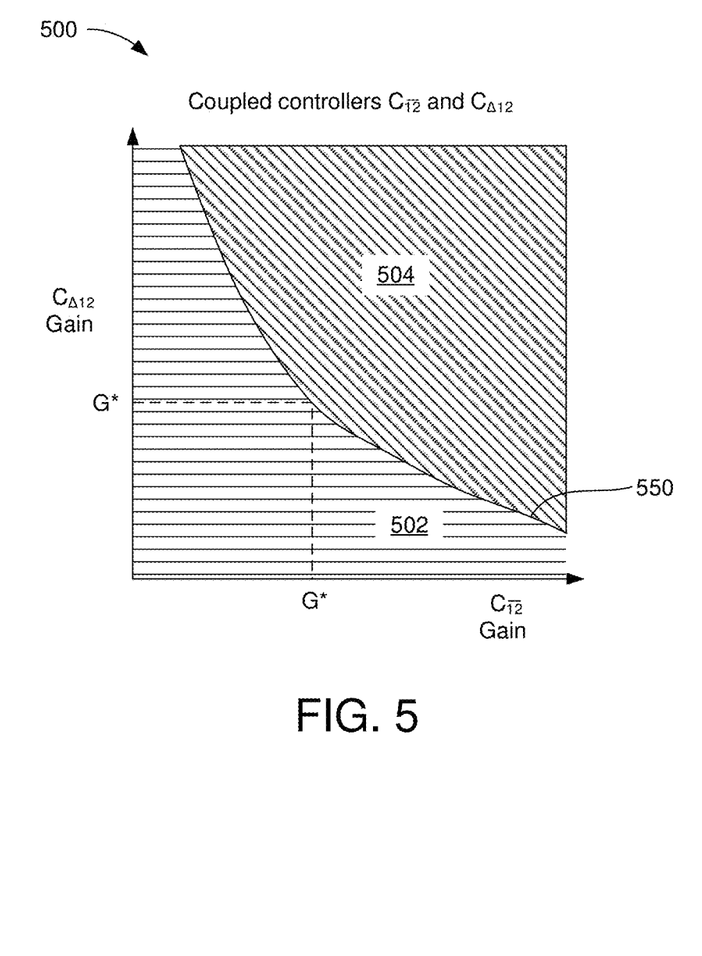
Figure 6:
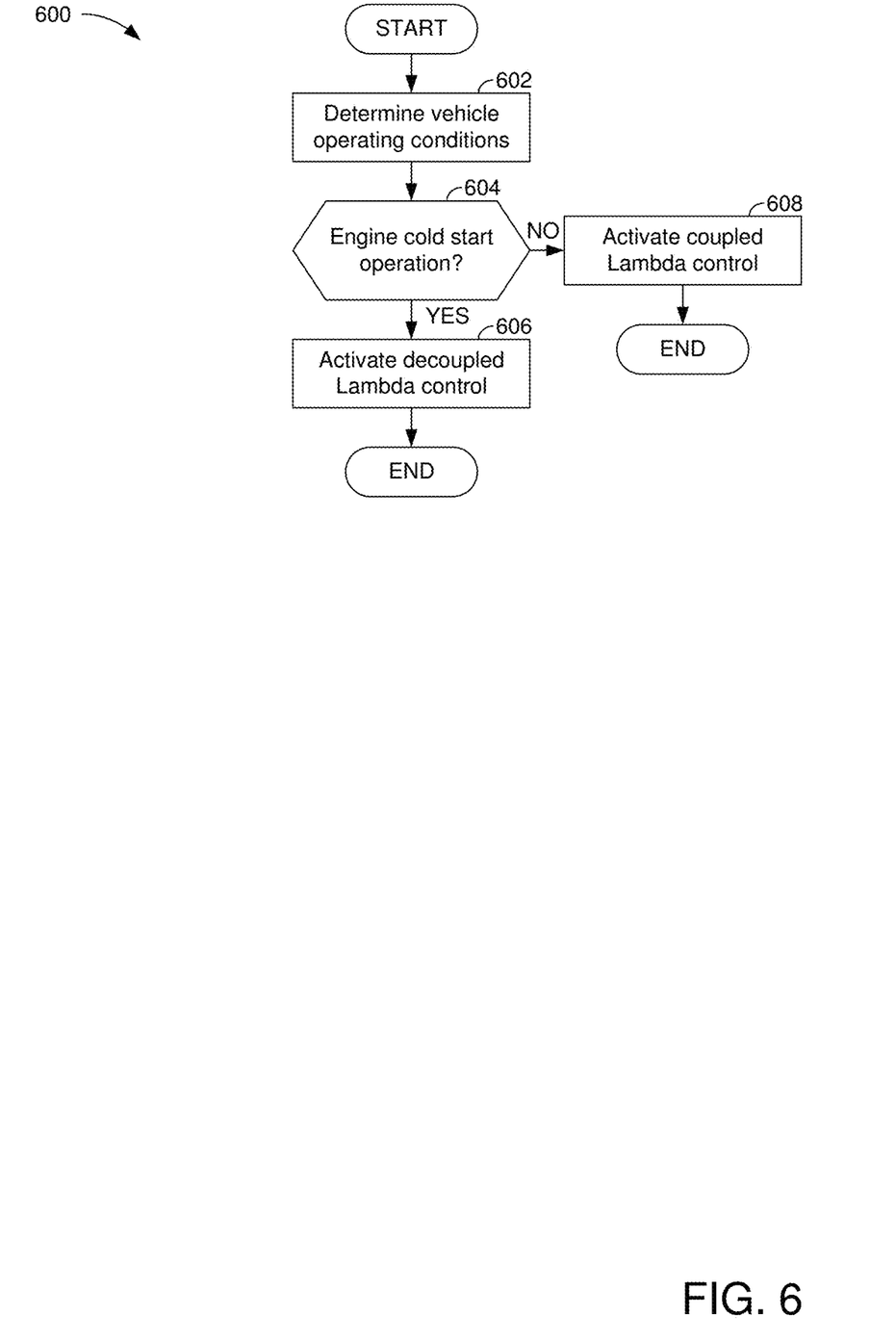
FIG. 6 is a flowchart for activating different fuel controllers.

The present description is related to controlling air-fuel ratios of engine cylinders of a V8 engine that includes four upstream oxygen sensors (e.g., four oxygen sensors in an exhaust system upstream of catalysts). A single cylinder of an internal combustion engine as shown in FIG. 1. In a first example, the air-fuel ratios of engine cylinders may be controlled via a first system as shown in FIG. 2. In a second example, the air-fuel ratios of engine cylinders may be controlled via a second system as shown in FIG. 3. FIGS. 4 and 5 illustrate stability plots for the air-fuel control approaches that are shown in FIGS. 2 and 3. FIG. 6 is a flowchart of a method for activating two different fuel controllers.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Direct fuel injector 66 is shown positioned to inject fuel directly into cylinder 35, which is known to those skilled in the art as direct injection. Fuel injector 66 delivers liquid fuel in proportion to a voltage pulse width or fuel injector pulse width of a signal from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. First oxygen sensor 126 (e.g., universal Exhaust Gas Oxygen (UEGO) sensor) is shown coupled to exhaust manifold 48 upstream of catalytic converter 70. Alternatively, a two-state exhaust gas oxygen sensor may be substituted for first oxygen sensor 126.

Catalytic converter 70 can include multiple catalyst bricks, in one example. In another example, multiple emission control devices, each with multiple bricks, can be used. Catalytic converter 70 can be a three-way type catalyst in one example.

Controller 12 is shown in FIG. 1 as a conventional microcomputer including: microprocessor unit 102, input/output ports 104, read-exclusive memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 for sensing a distance displaced by human 132; a position sensor 154 coupled to caliper application pedal 150 for sensing distance displaced by human 132, a measurement of engine manifold pressure (MAP) from pressure sensor 122 coupled to intake manifold 44; an engine position sensor 118 that senses a position of crankshaft 40; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses each revolution of the crankshaft from which engine speed (RPM) can be determined.

In some examples, the engine may be coupled to an electric motor/battery system in a hybrid vehicle. Further, in some examples, other engine configurations may be employed, for example a diesel engine with multiple fuel injectors. Further, controller 12 may receive input and communicate conditions such as degradation of components to light, or alternatively, human/machine interface 171.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, a plan view 200 of engine 10 is shown. Engine 10 is the same engine as shown in FIG. 1, but in FIG. 2, all engine cylinders are shown. In this example, the engine's cylinders are numbered 1 through 8. The cylinders are supplied with air via intake manifold 44. A first bank of cylinders includes cylinders 1-4 and a second bank of cylinders includes cylinders 5-8. Cylinders 1-4 are shown in fluidic communication with exhaust manifold 48 and cylinders 5-8 are shown in fluidic communication with exhaust manifold 220. Exhaust system 275 includes exhaust manifold 220 and catalyst 270 processes gases from cylinders 5-8. However, in other examples, an individual catalyst may be provided to process gases for cylinder pair [5,6] and another individual catalyst may be provided to process gases for cylinder pair [7,8]. Exhaust system 276 includes exhaust manifold 48 and catalytic converter 70 processes gases from cylinders 1-4. However, in other examples, an individual catalyst may be provided to process gases for cylinder pair [1,3] and another individual catalyst may be provided to process gases for cylinder pair [2,4]. Each of cylinders 1-8 includes a fuel injector, spark plug, and intake/exhaust valves as shown in FIG. 1.

A first oxygen sensor 126 is shown configured to sense exhaust gases from cylinders numbered 1 and 3. A second oxygen sensor 204 is shown configured to sense exhaust gases from cylinders 2 and 4. A third oxygen sensor 206 is shown configured to sense exhaust gases from cylinders numbered 5 and 6. A fourth oxygen sensor 208 is shown configured to sense exhaust gases from cylinders 7 and 8. There are no cylinders that are downstream of any of the exhaust gas sensors according to exhaust flow from the cylinders as indicated by arrows 230 and 240.

Output of first oxygen sensor 126 may be applied as air-fuel or equivalence ratio (e.g., $\lambda$=air-fuel ratio/stoichiometric air-fuel ratio) feedback for controlling fuel that is supplied to cylinders numbered 1 and 3. Output of second oxygen sensor 204 may be applied as air-fuel or equivalence ratio feedback for controlling fuel that is supplied to cylinders numbered 2 and 4. Output of third oxygen sensor 206 may be applied as air-fuel or equivalence ratio feedback for controlling fuel that is supplied to cylinders numbered 5 and 6. Output of fourth oxygen sensor 208 may be applied as air-fuel or equivalence ratio feedback for controlling fuel that is supplied to cylinders numbered 7 and 8.

FIG. 2 also illustrates four decoupled equivalence ratio controllers, or alternatively, fuel controllers, for the eight-cylinder engine with four upstream oxygen sensors. The first decoupled equivalence ratio controller is indicated as controller $C_1$ 250. Controller $C_1$ 250, controller $C_2$ 252, controller $C_3$ 254, and controller $C_4$ 256 may be proportional/integral controllers, proportional/integral/derivative controllers, Smith predictors, linear controllers, or non-linear controllers that may also include adaptive learning. These controllers as well as the difference or summing junctions (e.g., 260-266) may be incorporated as executable instructions stored in non-transitory memory of a controller as part of a method.

Controller $C_1$ controls fueling to a first pair of cylinders [1,3] according to, or in response to, a difference between a first oxygen sensor output derived lambda ($\lambda$) and a target lambda for the first cylinder pair ($\lambda_1^T$) to generate a fuel mass modification value ($m_1$). Controller $C_2$ controls fueling to a second pair of cylinders [2,4] according to, or in response to, a difference between a second oxygen sensor output derived lambda ($\lambda$) and a target lambda for the second cylinder pair ($\lambda_2^T$) to generate a fuel mass modification value ($m_2$). Controller $C_3$ controls fueling to a third pair of cylinders [5,6] according to, or in response to, a difference between a third oxygen sensor output derived lambda ($\lambda$) and a target lambda for the third cylinder pair ($\lambda_3^T$) to generate a fuel mass modification value ($m_3$). Controller $C_4$ controls fueling to a fourth pair of cylinders [7,8] according to, or in response to, a difference between a fourth oxygen sensor output derived lambda ($\lambda$) and a target lambda for the fourth cylinder pair ($\lambda_4^T$) to generate a fuel mass modification value ($m_4$).

The four controllers are decoupled in that each controller outputs a fuel mass correction for a sole pair of cylinders that is based on output of an oxygen sensor that senses exhaust gases from the sole pair of cylinders. Each of the controllers does not receive feedback from other upstream oxygen sensors that are not associated with the cylinders for which the controller adjusts fuel masses. For example, controller $C_1$ adjusts fuel mass $m_1$ to adjust amounts of fuel that are supplied to cylinders 1 and 3. Controller $C_1$ does not receive feedback from oxygen sensors 204, 206, and 208, nor does controller $C_1$ adjust fuel that is supplied to cylinders 2, 4, 5, 6, 7, and 8. Upstream is based on the exhaust flow direction and upstream oxygen sensors are oxygen sensor that are upstream of exhaust system catalysts and not downstream of exhaust system catalysts.

Turing now to FIG. 3, it illustrates coupled equivalence ratio controllers, or alternatively, fuel controllers, for the eight-cylinder engine with four upstream oxygen sensors. The first coupled equivalence ratio controller is indicated as controller $C_{\overline{12}}$ 352. Controller $C_{\overline{12}}$ 352, controller $C_{A12}$ 356, controller $C_{\overline{34}}$ 361, and controller $C_{A34}$ 365 may be proportional/integral controllers, proportional/integral/derivative controllers, Smith predictor, linear controllers, or non-linear controllers that may also include adaptive learning. These controllers as well as the difference or summing junctions (e.g., 351), halving blocks (e.g., 366), and average functions (e.g., 350) may be incorporated as executable instructions stored in non-transitory memory of a controller as part of a method.

Controller $C_{\overline{12}}$ 352 controls the average fueling of a first pair of cylinders [1,3] and a second pair of cylinders [2,4] according to an average of two oxygen sensor derived lambda values determined at block 350 (e.g., where $$\overline{u} = \frac{\lambda_1 + \lambda_2}{2},$$

where $\lambda_1$ is a lambda value derived from the output of first oxygen sensor 126, and where $\lambda_2$ is a lambda value derived from the output of second oxygen sensor 204) and a difference between the averaged oxygen sensor output derived lambda ($\overline{u}$) and a target average lambda for the first and second cylinder pairs $$\left(\lambda_{\overline{12}}^T\right)$$

as determined at difference or summing junction 351.

Controller $C_{A12}$ 356 controls delta or difference fueling for a first pair of cylinders [1,3] and a second pair of cylinders [2,4] according to a difference of two oxygen sensor derived lambda values determined at summing junction 354 (e.g., where output of summing junction 354 is $\delta = \lambda_1 - \lambda_2$) and a difference between the delta lambda of the first and second pairs of cylinders ($\delta$) and a target difference lambda for the first and second cylinder pairs $$\left(\lambda_{\Delta12}^T\right)$$

as determined at difference or summing junction 355 (e.g., where output of summing junction 355 is $$\left(\delta - \lambda_{\Delta12}^T\right)).$$

The output of controller $C_{A12}$ is multiplied by ½ at block 357. The output of block 357 is added to the output of block 352 (output of controller $C_{\overline{12}}$) at summing junction 353 to generate a fuel mass modification ($m_1$) value to the first pair of cylinders. The output of block 357 is subtracted from the output of block 352 (output of controller $C_{\overline{12}}$) at summing junction 358 to generate a fuel mass modification ($m_2$) value to the second pair of cylinders.

Controller $C_{\overline{34}}$ 361 controls the average fueling of a third pair of cylinders [5,6] and a fourth pair of cylinders [7,8] according to an average of two oxygen sensor derived lambda values determined at block 359 (e.g., where $$\overline{u} = \frac{\lambda_3 + \lambda_4}{2},$$

where $\lambda_3$ is a lambda value derived from the output of third oxygen sensor 206, and where $\lambda_4$ is a lambda value derived from the output of fourth oxygen sensor 208) and a difference between the averaged oxygen sensor output derived lambda ($\bar{u}$) and a target average lambda for the third and fourth cylinder pairs $$\left(\lambda\frac{T}{34}\right)$$

as determined at difference or summing junction 360.

Controller $C_{A34}$ 365 controls delta or difference fueling for the third pair of cylinders [5,6] and the fourth pair of cylinders [7,8] according to a difference of two oxygen sensor derived lambda values determined at summing junction 363 (e.g., where output of summing junction 363 is $\delta=\lambda_3-\lambda_4$) and a difference between the delta lambda of the third and fourth pairs of cylinders ($\delta$) and a target difference lambda for the third and fourth cylinder pairs ($\lambda_{A34}{}^T$) as determined at difference or summing junction 364 (e.g., where output of summing junction 364 is ($\delta-\lambda_{A34}{}^T$)). The output of controller $C_{A34}$ is multiplied by ½ at block 366. The output of block 366 is added to the output of block 361 (output of controller $C_{\overline{34}}$) at summing junction 362 to generate a fuel mass modification ($m_3$) value to the third pair of cylinders. The output of block 366 is subtracted from the output of block 361 (output of controller $C_{\overline{34}}$) at summing junction 367 to generate a fuel mass modification ($m_4$) value to the fourth pair of cylinders.

Thus, the controller of FIG. 3 controls fuel that is delivered to cylinders to an average lambda value and it also controls fuel to reduce a difference in lambda values between cylinder groups. In this example, the left bank of cylinders and the right bank of cylinders may be controlled independently.

Although FIGS. 2 and 3 describe systems in terms of a V8 engine, it may be appreciated that the approach described herein may be applied to a four-cylinder engine where two oxygen sensors are placed in an exhaust system upstream of a catalyst. The four-cylinder engine may utilize coupled and uncoupled controllers as shown herein.

The systems of FIGS. 1-3 provides for a fuel control system, comprising: a first cylinder bank coupled to an exhaust system that includes a first oxygen sensor upstream of a first catalyst and a second oxygen sensor upstream of the first catalyst; a second cylinder bank coupled to the exhaust system that includes a third oxygen sensor upstream of a second catalyst and a fourth oxygen sensor upstream of the second catalyst; and a controller including executable instructions stored in non-transitory memory for a first fuel controller, a second fuel controller, a third fuel controller, and a fourth fuel controller. In a first example, the fuel control system includes where the first fuel controller causes adjustment of a first fuel mass, where the second fuel controller causes adjustment of a second fuel mass, where the third fuel controller causes adjustment of a third fuel mass, and where the fourth fuel controller causes adjustment of a fourth fuel mass. In a second example that may include the first example, the fuel control system includes where the first fuel mass is supplied to a first pair of cylinders, where the second fuel mass is supplied to a second pair of cylinders, where the third fuel mass is supplied to a third pair of cylinders, and where the fourth fuel mass is supplied to a fourth pair of cylinders. In a third example that may include one or both of the first and second examples, the fuel control system includes where the first fuel controller adjusts the first fuel mass in response to a first difference between a first target lambda value and a first lambda value determined via the first oxygen sensor, where the second fuel controller adjusts the second fuel mass in response to a second difference between a second target lambda value and a second lambda value determined via the second oxygen sensor, where the third fuel controller adjusts the third fuel mass in response to a third difference between a third target lambda value and a third lambda value determined via the third oxygen sensor, where the fourth fuel controller adjusts the fourth fuel mass in response to a fourth difference between a fourth target lambda value and a fourth lambda value determined via the fourth oxygen sensor. In a fourth example that may include one or more of the first through third examples, the fuel control system includes where the first fuel controller adjusts a first fuel mass in response to a first average lambda determined via the first oxygen sensor and the second oxygen sensor, where the second fuel controller adjusts a second fuel mass in response to a first difference between lambda determined via the first oxygen sensor and lambda determined via the second oxygen sensor, where the third fuel controller adjusts a third fuel mass in response to a second average lambda determined via the third oxygen sensor and the fourth oxygen sensor, where the fourth fuel controller adjusts a fourth fuel mass in response to a second difference between lambda determined via the third oxygen sensor and lambda determined via the fourth oxygen sensor. In a fifth example that may include one or more of the first through fourth examples, the fuel control system includes where the first fuel mass is supplied to a first pair of cylinders and a second pair of cylinders, where the second fuel mass adds fuel to the first pair of cylinders and subtracts fuel from the second pair of cylinders, where the third fuel mass is supplied to a third pair of cylinders and a fourth pair of cylinders, and where the fourth fuel mass adds fuel to the third pair of cylinders and subtracts fuel from the fourth pair of cylinders. In a sixth example that may include one or more of the first through fifth examples, the fuel control system includes where each of the first oxygen sensor, the second oxygen sensor, the third oxygen sensor, and the fourth oxygen sensor is positioned at an exhaust gas confluence position for two engine cylinders.

Moving on to FIG. 4, it shows a plot 400 of a gain map for decoupled controllers $C_1$ and $C_2$ shown in FIG. 2. The gains may describe proportional relationships between the input or integral of the input of a controller and the output of the controller. Larger gains may tend to cause the controller to drive the plant that is being controlled to its target value sooner than smaller gains. However, larger gains may lead to instability (e.g., the engine fueling may oscillate about a target value instead of converging to the target value).

Plot 400 includes a vertical axis that represents gain values for controller $C_2$ and gain values for controller $C_2$ increase in the direction of the vertical axis. Plot 400 also includes a horizontal axis that represents gain values for controller $C_1$ and controller $C_1$ gain values increase from the left side of the plot to the right side of the plot.

The dotted back ground area 402 represents an area where gains for controllers $C_1$ and $C_2$ result in stable lambda control for the engine. Slash background area 404 represents an area where gains for controllers $C_1$ and $C_2$ result in plant operation instability. The G* gain values represent threshold gain values for controllers $C_1$ and $C_2$ that are not to be exceeded for stable plant operation. The G* gain values may be based on oxygen sensors that exhibit delayed response.

Referring now to FIG. 5, it shows a plot 500 of a gain map for coupled controllers $C_{\overline{12}}$ and $C_{A12}$ shown in FIG. 3. Plot 500 includes a vertical axis that represents gain values for controller $C_{A12}$ and gain values for controller $C_{A12}$ increase in the direction of the vertical axis. Plot 500 also includes a horizontal axis that represents gain values for controller $C_{\overline{12}}$ and gain values for controller $C_{\overline{12}}$ increase from the left side of the plot to the right side of the plot.

The back ground area with the horizontal lines 502 represents an area where gains for controllers $C_{\overline{12}}$ and $C_{\Delta 12}$ result in stable operation of the plant. Slash background area 504 represents an area where gains for controllers $C_{\overline{12}}$ and $C_{\Delta 12}$ result in plant operation instability. For comparison purposes, the G* gain value for the $C_1$ controller and the G* gain value for the $C_2$ controller are also included. Notice that the intersection of the gain G* for the $C_2$ controller and the gain G* for the $C_1$ controller intersect with the gain boundary of the coupled controller (e.g., line 550). Thus, it may be observed that the coupled controllers extend the stable operating region vertically and horizontally without shrinking the stable region along the diagonal direction of the plot (y=x).

Referring now to FIG. 6, a flowchart of a method for selecting and activating one of two fuel control systems according to vehicle operating conditions is shown. The method of FIG. 6 may be incorporated to the system of FIGS. 1-3 via executable instructions stored in non-transitory memory of a controller. The method of FIG. 6 may be applied to an engine system where pairs of cylinders share a same catalyst for processing gases of the pairs of cylinders.

At 602, method 600 determines operating conditions. Operating conditions may include but are not constrained to engine speed, engine load, ambient air temperature, catalyst temperature, engine temperature, and driver demand load. Method 600 may determine the operating conditions via the sensors described herein. Method 600 proceeds to 604.

At 604, method 600 judge whether or not the engine is operating at cold engine start conditions (e.g., engine temperature less than a threshold, catalyst temperature less than a threshold, time since most recent engine start is less than a threshold amount of time, etc.). If method 600 judges that the engine is being started or is operating under cold engine starting conditions, the answer is yes and method 600 proceeds to 606. Otherwise, the answer is no and method 600 proceeds to 608.

At 606, method 600 activates decoupled fuel control via activating decoupled controllers (e.g., $C_1$, $C_2$, $C_3$, and $C_4$ as shown in FIG. 2). Method 600 also deactivates the coupled controllers if the coupled controllers are activated. The decoupled controllers may be activated so that the lambda value of each cylinder pair may be converged to one quicker than if coupled controllers are applied. This may reduce NOx emissions and HC emissions. Method 600 proceeds to exit.

At 608, method 600 activates coupled fuel control via activating coupled controllers (e.g., $C_{\overline{12}}$, $C_{\Delta 12}$, $C_{\overline{34}}$, and $C_{\Delta 34}$ of FIG. 3). Activating the coupled controllers allows the cylinder lambda values to converge to an average value sooner than when decoupled controllers are activated. Consequently, once the catalyst reaches its light-off temperature, the coupled controllers may operate to provide lower tailpipe emissions than when decoupled controllers are activated. Method 600 may also deactivate decoupled controllers if the decoupled controllers are activated. Method 600 proceeds to exit.

Thus, method 600 may select and activate coupled or decoupled controllers according to whether the engine is being cold started and catalyst temperature is less than a light-off temperature. Selecting active controllers in this way may reduce emissions and leverage benefits of both types of controllers.

Thus, method 600 and at least portions of the systems shown in FIGS. 2 and 3 may provide for a method for operating an engine, comprising: supplying fuel to the engine via a first fuel controller, a second fuel controller, a third fuel controller, and a fourth fuel controller in response to a first lambda value determined via a first oxygen sensor, a second lambda value determined via a second oxygen sensor, a third lambda value determined via a third oxygen sensor, and a fourth lambda value determined via a fourth oxygen sensor. In a first example, the method further comprises adjusting a first fuel mass supplied to the engine via the first fuel controller in response to a first difference between a first target lambda and the first lambda value, adjusting a second fuel mass supplied to the engine via the second fuel controller in response to a second difference between a second target lambda and the second lambda value, adjusting a third fuel mass supplied to the engine via the third fuel controller in response to a third difference between a third target lambda and the third lambda value, and adjusting a fourth fuel mass supplied to the engine via the fourth fuel controller in response to a fourth difference between a fourth target lambda and the fourth lambda value. In a second example that may include the first example, the method further comprises averaging the first lambda value with the second lambda value to generate a first result, and inputting a first difference to the first fuel controller, the first difference between the first result and a first target average lambda. In a third example that may include one or both of the first and second examples, the method further comprises generating a second difference between the first lambda value and the second lambda value, and inputting a third difference between the second difference and a first target difference lambda value to the second fuel controller. In a fourth example that may include one or more of the first through third examples, the method further comprises averaging the third lambda value with the fourth lambda value to generate a second result, and inputting a fourth difference to the third fuel controller, the fourth difference between the second result and a second target average lambda. In a fifth example that may include one or more of the first through fourth examples, the method further comprises generating a fifth difference between the third lambda value and the fourth lambda value, and inputting a sixth difference between the fifth difference and a second target difference lambda value to the fourth fuel controller. In a sixth example that may include one or more of the first through fifth examples, the method includes where the first fuel controller and the second fuel controller adjust fuel supplied exclusively to cylinders of a first cylinder bank, and where the third fuel controller and the fourth fuel controller adjust fuel supplied exclusively to cylinders of a second cylinder bank. In a seventh example that may include one or more of the first through sixth examples, the method includes where the first fuel controller, the second fuel controller, the third fuel controller, and the fourth fuel controller are included as executable instructions stored in memory of a controller.

Thus, method 600 and at least portions of the systems shown in FIGS. 2 and 3 may provide for a method for operating an engine, comprising: operating the engine with activated decoupled fuel controllers and deactivated coupled fuel controllers in a first mode; and operating the engine with deactivated decoupled fuel controllers and activated coupled fuel controllers in a second mode. In a first example, the method includes where the first mode is activated in response to a catalyst temperature being less than a threshold temperature. In a second example that may include the first example, the method includes where the second mode is activated in response to a catalyst temperature being greater than a threshold temperature. In a third example that may include one or both of the first and second examples, the method includes where each of the activated decoupled fuel controllers control fuel supplied exclusively to a pair of cylinders of the engine. In a fourth example that may include one or more of the first through third examples, the method includes where each of the activated coupled fuel controllers control fuel supplied to two pairs of cylinders of the engine.

Note that the example control and estimation routines included herein can be used with various engine and/or vehicle system configurations. In addition, although the methods included herein refer to lambda control, the approaches herein may be applied with other units. For example, the approaches herein describe lambda control, but in other examples, the controls and methods may be configured for air-fuel ratio control. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A fuel control system, comprising:
a first cylinder bank coupled to an exhaust system that includes a first oxygen sensor upstream of a first catalyst and a second oxygen sensor upstream of the first catalyst; a second cylinder bank coupled to the exhaust system that includes a third oxygen sensor upstream of a second catalyst and a fourth oxygen sensor upstream of the second catalyst; and
a controller including executable instructions stored in non-transitory memory for a first fuel controller, a second fuel controller, a third fuel controller, and a fourth fuel controller.

2. The fuel control system of claim 1, where the first fuel controller causes adjustment of a first fuel mass, where the second fuel controller causes adjustment of a second fuel mass, where the third fuel controller causes adjustment of a third fuel mass, and where the fourth fuel controller causes adjustment of a fourth fuel mass.

3. The fuel control system of claim 2, where the first fuel mass is supplied to a first pair of cylinders, where the second fuel mass is supplied to a second pair of cylinders, where the third fuel mass is supplied to a third pair of cylinders, and where the fourth fuel mass is supplied to a fourth pair of cylinders.

4. The fuel control system of claim 2, where the first fuel controller adjusts the first fuel mass in response to a first difference between a first target lambda value and a first lambda value determined via the first oxygen sensor, where the second fuel controller adjusts the second fuel mass in response to a second difference between a second target lambda value and a second lambda value determined via the second oxygen sensor, where the third fuel controller adjusts the third fuel mass in response to a third difference between a third target lambda value and a third lambda value determined via the third oxygen sensor, where the fourth fuel controller adjusts the fourth fuel mass in response to a fourth difference between a fourth target lambda value and a fourth lambda value determined via the fourth oxygen sensor.

5. The fuel control system of claim 1, where the first fuel controller adjusts a first fuel mass in response to a first average lambda determined via the first oxygen sensor and the second oxygen sensor, where the second fuel controller adjusts a second fuel mass in response to a first difference between lambda determined via the first oxygen sensor and lambda determined via the second oxygen sensor, where the third fuel controller adjusts a third fuel mass in response to a second average lambda determined via the third oxygen sensor and the fourth oxygen sensor, where the fourth fuel controller adjusts a fourth fuel mass in response to a second difference between lambda determined via the third oxygen sensor and lambda determined via the fourth oxygen sensor.

6. The fuel control system of claim 5, where the first fuel mass is supplied to a first pair of cylinders and a second pair of cylinders, where the second fuel mass is added to the first pair of cylinders and subtracted from the second pair of cylinders, where the third fuel mass is supplied to a third pair of cylinders and a fourth pair of cylinders, and where the fourth fuel mass is added to the third pair of cylinders and subtracted from the fourth pair of cylinders.

7. The fuel control system of claim 1, where each of the first oxygen sensor, the second oxygen sensor, the third oxygen sensor, and the fourth oxygen sensor is positioned at an exhaust gas confluence position for two engine cylinders.

8. A method for operating an engine, comprising:
supplying fuel to the engine via a first fuel controller, a second fuel controller, a third fuel controller, and a fourth fuel controller in response to a first lambda value determined via a first oxygen sensor, a second lambda value determined via a second oxygen sensor, a third lambda value determined via a third oxygen sensor, and a fourth lambda value determined via a fourth oxygen sensor.

9. The method of claim 8, further comprising adjusting a first fuel mass supplied to the engine via the first fuel controller in response to a first difference between a first target lambda and the first lambda value, adjusting a second fuel mass supplied to the engine via the second fuel controller in response to a second difference between a second target lambda and the second lambda value, adjusting a third fuel mass supplied to the engine via the third fuel controller in response to a third difference between a third target lambda and the third lambda value, and adjusting a fourth fuel mass supplied to the engine via the fourth fuel controller in response to a fourth difference between a fourth target lambda and the fourth lambda value.

10. The method of claim 8, further comprising averaging the first lambda value with the second lambda value to generate a first result, and inputting a first difference to the first fuel controller, the first difference between the first result and a first target average lambda.

11. The method of claim 10, further comprising generating a second difference between the first lambda value and the second lambda value, and inputting a third difference between the second difference and a first target difference lambda value to the second fuel controller.

12. The method of claim 11, further comprising averaging the third lambda value with the fourth lambda value to generate a second result, and inputting a fourth difference to the third fuel controller, the fourth difference between the second result and a second target average lambda.

13. The method of claim 12, further comprising generating a fifth difference between the third lambda value and the fourth lambda value, and inputting a sixth difference between the fifth difference and a second target difference lambda value to the fourth fuel controller.

14. The method of claim 8, where the first fuel controller and the second fuel controller adjust fuel supplied exclusively to cylinders of a first cylinder bank, and where the third fuel controller and the fourth fuel controller adjust fuel supplied exclusively to cylinders of a second cylinder bank.

15. The method of claim 8, where the first fuel controller, the second fuel controller, the third fuel controller, and the fourth fuel controller are included as executable instructions stored in memory of a controller.

16. A method for operating an engine, comprising:
   operating the engine with activated decoupled fuel controllers and deactivated coupled fuel controllers in a first mode; and
   operating the engine with deactivated decoupled fuel controllers and activated coupled fuel controllers in a second mode.

17. The method of claim 16, where the first mode is activated in response to a catalyst temperature being less than a threshold temperature.

18. The method of claim 16, where the second mode is activated in response to a catalyst temperature being greater than a threshold temperature.

19. The method of claim 16, where each of the activated decoupled fuel controllers control fuel supplied exclusively to a pair of cylinders of the engine.

20. The method of claim 16, where each of the activated coupled fuel controllers control fuel supplied to two pairs of cylinders of the engine.

* * * * *